United States Patent
Schmidt et al.

(10) Patent No.: US 9,994,718 B2
(45) Date of Patent: Jun. 12, 2018

(54) FORMABLE HARD COATED PC/PMMA COEXTRUDED FILMS

(71) Applicant: Covestro Deutschland AG, Leverkusen (DE)

(72) Inventors: Axel Schmidt, Köln (DE); Guangxia Hu, Singapore (SG); Xiaofeng Luo, Singapore (SG); Yanni See, Singapore (SG)

(73) Assignee: Covestro Deutschland AG, Leverkusen (DE)

( * ) Notice: Subject to any disclaimer, the term of this patent is extended or adjusted under 35 U.S.C. 154(b) by 0 days. days.

(21) Appl. No.: 15/023,594

(22) PCT Filed: Sep. 23, 2014

(86) PCT No.: PCT/EP2014/070248
§ 371 (c)(1),
(2) Date: Mar. 21, 2016

(87) PCT Pub. No.: WO2015/044137
PCT Pub. Date: Apr. 2, 2015

(65) Prior Publication Data
US 2016/0215148 A1    Jul. 28, 2016

(30) Foreign Application Priority Data
Sep. 27, 2013  (EP) .................................... 13186278

(51) Int. Cl.
*B32B 27/08* (2006.01)
*C09D 4/00* (2006.01)
(Continued)

(52) U.S. Cl.
CPC ............... *C09D 4/00* (2013.01); *B32B 27/08* (2013.01); *B32B 27/308* (2013.01);
(Continued)

(58) Field of Classification Search
CPC ............ B32B 2250/02; B32B 2250/24; B32B 2255/10; B32B 2255/26; B32B 2307/584;
(Continued)

(56) References Cited

U.S. PATENT DOCUMENTS

| | | |
|---|---|---|
| 2,970,131 A | 1/1961 | Moyer, Jr. |
| 2,991,273 A | 7/1961 | Hechelhammer et al. |

(Continued)

FOREIGN PATENT DOCUMENTS

| | | |
|---|---|---|
| DE | 1570703 A1 | 2/1970 |
| DE | 2 063 050 A1 | 7/1972 |

(Continued)

OTHER PUBLICATIONS

International Search Report for PCT/EP2014/070248 dated Dec. 10, 2014.

*Primary Examiner* — Lawrence Ferguson
(74) *Attorney, Agent, or Firm* — Drinker Biddle & Reath LLP

(57) ABSTRACT

The present invention provides a formable hard coating composition, comprising a binder, comprising at least one acrylate oligomer and at least one monofunctional acrylate monomer and a crosslinking agent, comprising at least one multifunctional acrylate or methacrylate monomer. Furthermore, the present invention provides a coated film comprising a coextruded PC/PMMA film and a coating obtained by coating with the hard coating composition, wherein the coating has a dry film thickness according to ASTM B499 in the range of from $\geq 1$ to $\leq 6$ μm and preferably a crosslink density in the range of from $\geq 2 \cdot 10^{-3}$ to $\leq 13 \cdot 10^{-3}$. The coated films exhibit a combination of good formability and pencil hardness, solvent and chemical resistance which makes it particular useful for applications such as in-mold decoration processes.

13 Claims, 3 Drawing Sheets

(51) Int. Cl.
  *C09D 4/06* (2006.01)
  *C09D 133/08* (2006.01)
  *B32B 27/30* (2006.01)
  *B32B 27/36* (2006.01)

(52) U.S. Cl.
  CPC .............. *B32B 27/365* (2013.01); *C09D 4/06* (2013.01); *C09D 133/08* (2013.01); *B32B 2250/02* (2013.01); *B32B 2250/24* (2013.01); *B32B 2255/10* (2013.01); *B32B 2255/26* (2013.01); *B32B 2307/584* (2013.01); *B32B 2451/00* (2013.01)

(58) Field of Classification Search
  CPC ... B32B 2451/00; B32B 27/08; B32B 27/308; B32B 27/365; C09D 133/08; C09D 4/00; C09D 4/06
  USPC .................................. 428/212, 220
  See application file for complete search history.

(56) References Cited

U.S. PATENT DOCUMENTS

| | | | |
|---|---|---|---|
| 2,999,835 A | 9/1961 | Goldberg | |
| 2,999,846 A | 9/1961 | Schnell et al. | |
| 3,028,365 A | 4/1962 | Schnell et al. | |
| 3,062,781 A | 11/1962 | Bottenbruch et al. | |
| 3,148,172 A | 9/1964 | Fox | |
| 3,271,367 A | 9/1966 | Schnell et al. | |
| 3,275,601 A | 9/1966 | Schnell et al. | |
| 3,879,348 A | 4/1975 | Serini et al. | |
| 4,642,126 A | 2/1987 | Zador et al. | |
| 5,126,428 A | 6/1992 | Freitag et al. | |
| 2008/0182046 A1* | 7/2008 | Brambrink | B29C 45/14778 428/34 |
| 2009/0117378 A1* | 5/2009 | Hu | B29D 11/0073 428/354 |
| 2009/0269568 A1 | 10/2009 | Kuhlmann et al. | |
| 2011/0253301 A1* | 10/2011 | Yamanaka | B32B 7/12 156/247 |

FOREIGN PATENT DOCUMENTS

| | | |
|---|---|---|
| DE | 2 063 052 A1 | 7/1972 |
| DE | 2211956 A1 | 10/1973 |
| DE | 3832396 A1 | 2/1990 |
| EP | 0359953 A1 | 3/1990 |
| FR | 1561518 A | 3/1969 |
| GB | 1122003 A | 7/1968 |
| GB | 1229482 A | 4/1971 |
| GB | 1367790 A | 9/1974 |
| JP | 2009062401 A | 3/2009 |
| JP | 2009220280 A | 10/2009 |
| JP | 2009274378 A | 11/2009 |
| JP | 2011088962 A | 5/2011 |
| JP | 2011126157 A | 6/2011 |
| JP | 2013082833 A | 5/2013 |
| KR | 100362645 B1 | 11/2002 |
| KR | 20090072199 A | 7/2009 |
| KR | 100981054 B1 | 9/2010 |

\* cited by examiner

FORMABLE HARD COATED PC/PMMA COEXTRUDED FILMS

CROSS-REFERENCE TO RELATED APPLICATIONS

This application is a national stage application (under 35 U.S.C. § 371) of PCT/EP2014/070248, filed Sep. 23, 2014, which claims benefit of European Application No. 13186278.1, filed Sep. 27, 2013, both of which are incorporated herein by reference in their entirety.

The present invention relates to a hard coating composition and PC/PMMA coextruded films coated with the hard coating composition. The films are particularly useful for applications in in-mold decoration (IMD) processes.

BACKGROUND OF THE INVENTION

In-mold decoration (IMD) involves inserting decorative coated/non-coated films into a molding tool followed by injection molding process. The decorative films are covered on the surface of injection parts, resulting in decorative effects. The pattern image on the back of decorative films is sandwiched between the decorative films and injection parts. Therefore, the pattern image shows long durability.

Since polymeric films such as polycarbonate (PC) and polyethylene terephthalate (PET) show poor scratch resistance property, hard coatings are normally required to protect the surface of polymeric films.

To protect the surface of decorative films, hard coatings to be applied on the surface are required to be resistant to scratch, abrasion and chemical attacks. In general, good surface properties require a high crosslink density of the coating. However, high crosslink density leads to poor formability of coated films. During the forming process of the coated film, the coating tends to crack.

To achieve both high formability and surface durability of coated films against scratch and abrasion, drying and UV curing of the coatings in two steps, before and after film forming process are applied. Such process is disclosed in U.S. Pat. No. 2009/0269568 A1, which describes coated films wherein the coating comprises a polyurethane acrylates and nanoparticles; another process comprising two UV curing steps before and after film forming process, is described in JP 2009062401 wherein the coating comprises a UV curing resin composition which has an acrylate and a methacrylate as a main component.

Moderate formability and surface durability of coated films are also required for some applications. Before the film forming process, the coating on the surface of films has been cured, which means no additional UV curing process is required after the film forming process. To show a certain level of pencil hardness of the coated films, both crosslink density of the coating and substrates chosen should be considered. Compared to formable hard coated PC films, formable hard coated PET films show higher pencil hardness. JP 2011088962 describes a UV-cured hard coated film comprising PET as substrate and a top coating layer, which contains (meth)acryloyl group-containing epoxy (meth) acrylate, JP 2009274378 discloses similar laminated films in which the UV-curing materials contain urethane acrylate and/or epoxy acrylate. The similar laminated films have also been disclosed in JP 2009220280 in which the UV-curing materials contain polyester acrylate/urethane acrylate. UV-curing materials with acrylate (3 or more function groups)/ acrylate (1 or 2 function groups)/UV radiation hardening-type silicone resin/nanoparticles (20~300 nm) have been disclosed in JP 2011126157.

However, formable hard coated PET films show some drawbacks in terms of forming accuracy and poor adhesion to the injection parts which restrain the application of formable coated PET films for housing application. On the other hand, formable hard coated PC films show better forming accuracy and adhesion to injection parts due to the mechanical and surface properties of PC.

BRIEF SUMMARY OF THE INVENTION

As substrates, neither formable hard coated PC nor PET meet the requirements of high pencil hardness, moderate formability, good forming accuracy and adhesion to injection parts.

In summary, there is a need for a hard coating and a hard coated film which show an improvement in at least one of scratch resistance, abrasion resistance and chemical resistance in combination of a formability, in particular in common molding processes such as in-mold decoration processes.

Accordingly, the present invention provides a formable hard coating composition, comprising
    a binder, comprising at least one acrylate oligomer and at least one monofunctional acrylate monomer; and
    a crosslinking agent, comprising at least one multifunctional acrylate or methacrylate monomer.

The binder comprises at least one acrylate oligomer and at least one monofunctional acrylate monomer.

As acrylate oligomers, any of acrylate oligomer known in the art may be employed, such as polyester acrylates, polyether acrylates, polyacryl acrylates and urethane acrylates. In general, oligomers are described in Chemistry & Technology of UV &. EB Formulation for Coatings, Inks & Paints, Vol. 2, 1991, SITA Technology, London (P.K.T: Oldring (Ed.) p. 73-123 (urethane acrylates) and p. 123-135 (polyester acrylates), respectively. Particular useful in the present invention are the following commercially available aliphatic urethane acrylates such as Ebecryl® 4858, Ebecryl® 284, Ebecryl® 265, Ebecryl® 264, Ebecryl® 8465, Ebecryl® 8402 (Cytec Surface Specialities), Craynor® 925 of Cray Valley, Viaktin® 6160 of Vianova Resin, Desmolux VP LS 2265 of Bayer MaterialScience AG, Photomer 6891 of Cognis.

DETAILED DESCRIPTION OF THE INVENTION

In a preferred embodiment of the formable hard coat composition of the present invention, the at least one acrylate oligomer is selected from the group consisting of polyester acrylate oligomers, polyacryl acrylate oligomers and urethane acrylate oligomers, and mixtures thereof. Preferably, the at least one acrylate oligomer is at least one urethane acrylate oligomer.

The at least one monofunctional monomer of the binder for the formable hard coating composition according to the Present invention is an acrylate or methacrylate monomer. Esters of acrylic acid or methacrylic acid are generally referred to as acrylates or methacrylates. Examples of acrylates and methacrylates which may be used are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, trichlorophenyl acrylate, trichlorophenyl methacrylate, tribromophenyl acrylate, tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoxyethoxyethyl methacrylate, 2-naphthyl acrylate, 2-naphthyl methacrylate, 1,4-his-(2-thionaphthyl)-2-butyl acrylate, 1,4-bis-(2-thionaphthyl)-2-butyl methacrylate, bisphenol A diacrylate, bisphenol A dimethacrylate, tetrabromobisphenol A diacrylate, tetrabromobisphenol A dimethacrylate, 2,2,2-trifluoroethyl acrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate and/or 2,2,3,3,3-pentafluoropropyl methacrylate.

In addition, some commercially available urethane acrylate solutions may be used, e.g, Laromer® 8987 (70% in hexandioldiacrylate) of BASF AG, Desmolux U 680 H (80% in hexandioldiacrylate) of Bayer MaterialScience AG, Craynor® 945B85 (85% in hexandioldiacrylate), Ebecryl® 294/25HD (75% in hexandioldiacrylate), Ebecryl® 8405 (80% in hexandioldiacrylate), Ebecryl® 4820 (65% in hexandioldiacrylate) (Cytec Surface Specialities) of Craynor® 963B80 (80% in hexandioldiacrylate) of Cray Valley or polyester acrylates such as Ebecryl® 810, 830 or polyacryl acrylates such as Ebecryl®, 740, 745, 767 or 1200 from Cytec Surface Specialities.

As the at least one multifunctional acrylate or methacrylate monomer for the crosslinking agent of the formable hard coating composition according to the present invention, bifunctional, trifunctional, tetrafunctional, pentafunctional or hexafunctional acryl- and/or methacrylmonomers are preferably suited. Suitable multifunctional acryl- and/or methacrylicesters are derived from aliphatic polyhydroxy compounds having at least 2, preferably at least 3 and more preferably at least 4 hydroxy groups and preferably of from 2 to 12 carbon atoms.

Examples for these aliphatic polyhydroxy compounds are ethyleneglycol, propylenglycol, butanediol-1,4, hexanediol-1,6, diethyleneglycol, triethyleneglycol, glycerine, trimethylolpropane, pentaerythrit, dipentaerythrit, tetramethylolethane and sorbitol.

Examples for the respective esters of these compounds are glykol-diacrylate and -dimethacrylate, butanedioldiacrylate or -dimethacrylate, dimethylolpropane-diacrylate or -dimethacrylate, diethyleneglykol-diacrylate or -dimethacrylate, divinylbenzene, trimethylolpropane-tiacrylate or -trimethacrylate, glycerinetriacrylate or -trimethacrylate, pentaerythrit-tetraacylate or -tetramethacrylate, dipentaerythrit-penta/hexaacylate (DPHA), 1,2,3,4-butanetetraol-tetraacylate or -tetramethacrylate, tetramethylolethan-tetraacrylate or -tetramethacrylate, 2,2-dihydroxy-propanediol-1,3-tetraacrylate or -tetramethacrylate, diurethanedimethacrylate (UDMA), sorbitan-tetra-, -penta- or -hexa-acrylate or the corresponding methacrylates and mixtures thereof.

Further examples for compounds of the crosslinking agent are alkoxylated di-, tri-, tetra-, penta- and hexacrylates or -methacrylates. Examples for alkoxylated diacrylates or -methacrylates are alkoxylated, preferably ethoxylated methanedioldiacrylate, methanedioldimethacrylate, glycerinediacrylate, glycerinedimethacrylate, neopentylglycoldiacrylate, neopentylglycoldimethacrylate, 2-butyl-2-ethyl-1,3-propanedioldiacrylate, 2-butyl-2-ethyl-1,3-propanedioldimethacrylate, trimethylolpropanediacrylate or trimethylolpropanedimethacrylate. Examples for alkoxylated triacrylates or -methacrylates are alkoxylated, preferably ethoxylated pentaerythrit-triacrylate, pentaerythrit-trimethacrylate, glycerinetriacrylate, glycerinetrimethacrylate, 1,2,4-butanetrioltriacrylate, 1,2,4-butanetrioltrimethacrylate, trimethylolpropanetriacrylate, trimethylolpropanetrimethacrylate, tricyclodecanedmethanoldiacrylate, tricyclodecanedimethanoldimethacrylate, ditrimethylolpropanetetraacrylate or ditrimethylolpropanetetramethacrylate. Examples for alkoxylated tetra-, penta- or hexaacrylates are alkoxylated, preferably ethoxylated pentacrythrit-tetraacrylate, dipentaerythrit-tetraacrylate, dipentaerythrit-pentaacrylate, dipentaerythrit-hexaacrylate, pentaerythrit-tetramethacrylate, dipentaerythrit-tetramethacrylate, dipentaerythrit-pentamethacrylate or dipentaerythrit-hexamethacrylate.

In a preferred embodiment of the present invention, the proportion of the at least one binder in the composition is in the range of from 2 to 28 wt.-%, preferably in the range of from 3 to 26 wt.-%, more preferably in the range of from 4 to 25 wt.-%, based on the total weight of the composition and the proportion of the at least one crosslinking agent in the composition is in the range of from 2 to 28 wt.-%, more preferably in the range of from 4 to 25 wt.-%, based on the total weight of the composition.

It is further preferred that the ratio of the binder to the crosslinking agent is in the range of from 1:1 to 10:1.

The present invention further provides a coated film, comprising a coextruded PC/PMMA film and a coating on the PMMA layer obtained by coating with the formable hard coating composition according to the present invention, wherein the coating has a dry film thickness according to ASTM B499 in the range of from $\geq 1$ to $\leq 6$ μm, preferably in the range of from $\geq 2$ to $\leq 5$ μm, and preferably has a crosslink density in the range of from $\geq 2 \cdot 10^{-3}$ to $\leq 13 \cdot 10^{-3}$, preferably in the range of from $\geq 3.5 \cdot 10^{-3}$ to $\leq 12.5 \cdot 10^{-3}$, more preferably in the range of from $\geq 5 \cdot 10^{-3}$ to $\leq 10 \cdot 10^{-3}$. The dry film thickness (DFT) according to ASTM B499 is also one of the key factors determining the advantageous properties of the coated film of the present invention. Generally, high DFT leads to lower performance in formability, while, for example, pencil hardness improves when increasing the DFT of the coating. When the Coating has the above-mentioned thickness, the combination of desirable properties in terms of formability and resistance is obtained.

The coated films according to the present invention exhibit a particular resistance to chemicals, solvents and abrasion while also showing good formability. The best combination of resistance to chemicals, solvent and abrasion, in particular in combination with a good formability is obtained when the coating exhibits a crosslink density within the above-mentioned limits. In particular, when the crosslink density exceeds $13 \cdot 10^{-3}$, the coated films show only medium formability. On the other hand, at crosslink densities under $2 \cdot 10^{-3}$, although the films show good formability, the pencil hardness, chemical, solvent and abrasion resistance is not optimal. Thus, in a particular preferred embodiment of the present invention, the coatings of the coated films exhibit a crosslink density in the range of from $\geq 2 \cdot 10^{-3}$ to $\leq 13 \cdot 10^{-3}$, preferably in the range of from $\geq 3.5 \cdot 10^{-3}$ to $\leq 12.5 \cdot 10^{-3}$, more preferably in the range of from $\geq 5 \cdot 10^{-3}$ to $\leq 10 \cdot 10^{-3}$. The crosslink density can be determined by methods well known to the skilled person, in particular, as described in R. Schwalm, UV Coatings-Basic, Recent Developments and New Applications, Elsevier Science, 2006, Amsterdam; Chen et al. Progress in Organic Coatings 55, 2006, p. 291 to 295; the measurement of the parameters employed is described in ASTM D4752, ASTM D5402. The determination of the crosslink density of high molecular weight polyethylene as described in ASTM F2212 can also be used.

The coated film comprises a PC/PMMA coextruded film. Suitable polycarbonates are preferably high molecular weight, thermoplastic, aromatic polycarbonates with $M_w$ (weight average of the molecular weight) of at least 10 000, preferably from 20 000 to 300 000, which contain bifunctional carbonate structural units of formula (I),

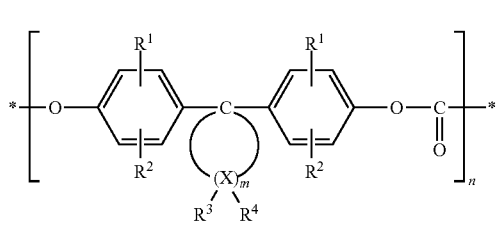
(I)

wherein
$R^1$ and $R^2$ independently of one another signify hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, particularly benzyl, m signifies an integer of from 4 to 7, preferably 4 or 5, $R^3$ and $R^4$ may be selected for each X individually and, independently of one another, signify hydrogen or $C_1$-$C_6$ alkyl and X signifies carbon, and n signifies an integer of 30 or greater, particularly preferably an integer of from 50 to 900, most particularly preferably an integer of from 60 to 250, with the proviso that, on at least one X atom, $R^3$ and $R^4$ simultaneously signify alkyl.

Starting products for the polycarbonates are dihydroxydiphenyl cycloalkanes of the formula (Ia)

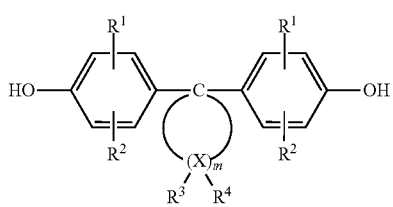
(Ia)

wherein

X, $R^1$, $R^2$, $R^3$, $R^4$, m and n have the meaning given for formula (I).

Preferably, $R^3$ and $R^4$ are simultaneously alkyl on one to two X atoms, particularly only on one X atom.

The preferred alkyl radical is methyl; the X atoms in alpha position to the diphenyl-substituted C atom (C-1) are preferably not dialkyl-substituted, however the alkyl disubstitution in beta position to C-1 is preferred.

Dihydroxydiphenyl cycloalkanes with 5 and 6 ring C atoms in the cycloaliphatic radical (m=4 or 5 in formula (Ia)), e.g. the diphenols of formulae (Ib) to (Id), are preferred,

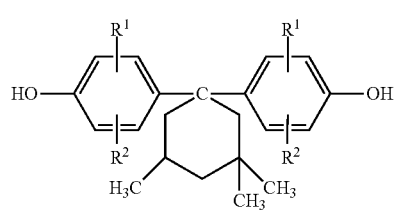
(Ib)

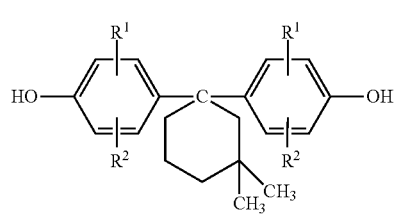
(Ic)

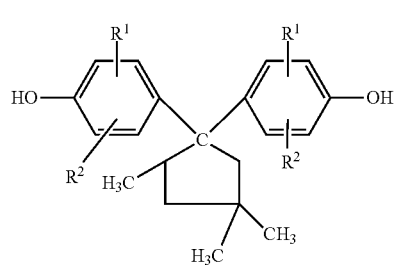
(Id)

wherein 1,1-bis(4-hydroxyphenyl)-3,3,5-trimethylcyclohexane (formula (Ib) with $R^1$ and $R^2$ equal to H) is particularly preferred. The polycarbonates can be produced in accordance with German patent application no. DE 38 32396.6 or EP 0 359 953 A from diphenols of formula (Ia).

It is possible to use either one diphenol of formula (Ia) with the formation of homopolycarbonates or several diphenols of formula (Ia) with the formation of copolycarbonates.

In addition, the diphenols of formula (Ia) can also be used in a mixture with other diphenols, e.g. with those of formula (Ie)

HO—Z—OH     (Ie), for the production of high molecular weight, thermoplastic, aromatic polycarbonates.

Suitable other diphenols of formula (Ie) are those in which Z is an aromatic radical with 6 to 30 C atoms, which can contain one or more aromatic rings, can be substituted and can contain aliphatic radicals or cycloaliphatic radicals other than those of formula (Ia) or hetero atoms as bridge-type crosslinks.

Examples of the diphenols of formula (Ie) are: hydroquinone, resorcinol, dihydroxydiphenyls, bis-(hydroxyphenyl) alkanes, bis(hydroxyphenyl)cycloalkanes, bis(hydroxyphenyl) sulfides, bis-(hydroxyphenyl) ethers, bis (hydroxyphenyl) ketones, bis(hydroxyphenyl) sulfones, bis (hydroxyphenyl) sulfoxides, alpha,alpha'-bis (hydroxyphenyl) diisopropylbenzenes and the ring-alkylated and ring-halogenated compounds thereof.

These and other suitable diphenols are described e.g. in U.S. Pat. No. 3,028,365, U.S. Pat. No. 2,999,835, U.S. Pat. No. 3,148,172, U.S. Pat. No. 3,275,601, U.S. Pat. No. 2,991,273, U.S. Pat. No. 3,271,367, U.S. Pat. No. 3,062,781, U.S. Pat. No. 2,970,131 and U.S. Pat. No. 2,999,846, in DE-A 1 570 703, DE-A 2 063 050, DE-A 2 063 052, DE-A 2 211 956, Fr-A 1 561 518 and in the monograph "H. Schnell, Chemistry and Physics of Polycarbonates, Interscience Publishers, New York 1964".

Preferred other diphenols are e.g.: 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, alpha,alpha-bis(4-hydroxyphenyl)-p-diisopropylbenzene, 2,2-bis(3-methyl-4-hydroxyphenyl) propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)cyclohexane, alpha,alpha-bis(3,5-dimethyl-4-hydroxyphenyl)-p-diisopropylbenzene, 2,2-bis(3,5-dichloro-4-hydroxyphenyl)propane and 2,2-bis(3,5-dibromo-4-hydroxyphenyl)propane.

Particularly preferred diphenols of formula (Ie) are e.g.: 2,2-bis(4-hydroxyphenyl)propane, 2,2-bis-(3,5-dimethyl-4-hydroxyphenyl)propane, 2,2-bis(3,5-dichloro-4-hydroxyphenyl)propane, 2,2-bis(3,5-dibromo-4-hydroxyphenyl)propane and 1,1-bis(4-hydroxyphenyl)cyclohexane.

In particular, 2,2-bis(4-hydroxyphenyl)propane is preferred. The other diphenols can be used either individually or in a mixture.

The molar ratio of diphenols of formula (Ia) to the other diphenols of formula (Ie) optionally also used, should be between 100 mole % (Ia) to 0 mole % (Ie) and 2 mole % (Ia) to 98 mole % (Ie), preferably between 100 mole % (Ia) to 0 mole % (Ie) and 10 mole % (Ia) to 90 mole % (Ie) and particularly between 100 mole % (Ia) to 0 mole % (Ie) and 30 mole % (Ia) to 70 mole % (Ie).

The high molecular weight polycarbonates made from the diphenols of formula (Ia), optionally in combination with other diphenols, can be produced by the known polycarbonate production processes. The various diphenols in this case can be connected to one another either randomly or in blocks.

The polycarbonates according to the invention can be branched in a manner that is known per se. If branching is desired, it can be achieved in a known manner by incorporation by condensation of small quantities, preferably quantities of between 0.05 and 2.0 mole % (based on diphenols used), of trifunctional or more than trifunctional compounds, particularly those with three or more than three phenolic hydroxyl groups. Suitable branching agents with three or more than three phenolic hydroxyl groups are:

phloroglucinol, 4,6-dimethyl-2,4,6-tri-(4-hydroxyphenyl) heptene-2,4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-[4,4-bis(4-hydroxyphenyl)cyclohexyl]propane, 2,4-bis(4-hydroxyphenylisopropyl)phenol, 2,6-bis-(2-hydroxy-5-methylbenzyl)-4-methylphenol, 2-(4-hydroxyphenyl)-2-(2,4-dihydroxyphenyl)propane, hexa-[4-(4-hydroxyphenylisopropyl)phenyl]-orthoterephthalic acid ester, tetra-(4-hydroxyphenyl)methane, tetra-[4-(4-hydroxyphenyl-isopropyl)phenoxy]methane and 1,4-bis-[4',4"-dihydroxytriphenyl)methyl]benzene.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

As chain terminators for the regulation of the molecular weight of the polycarbonates, which is known per se, monofunctional compounds are used in conventional concentrates. Suitable compounds are e.g. phenol, tert.-butylphenols or other alkyl-substituted phenols. To regulate the molecular weight, small quantities of phenols of formula (If) are particularly suitable

wherein

R represents a branched $C_8$ and/or $C_9$ alkyl radical.

The proportion of $CH_3$ protons in the alkyl radical R is preferably between 47 and 89% and the proportion of CH and $CH_2$ protons between 53 and 11%; it is also preferred for R to be in o- and/or p-position to the OH group, and particularly preferred for the upper limit of the ortho fraction to be 20%, The chain terminators are generally used in quantities of 0.5 to 10, preferably 1.5 to 8 mole %, based on diphenols used.

The polycarbonates can preferably be produced by the interfacial polycondensation process (cf. H. Schnell "Chemistry and Physics of Polycarbonates", Polymer Reviews, vol. IX, page 33 et seq., Interscience Publ. 1964) in a manner that is known per se.

In this process, the diphenols of formula (Ia) are dissolved in an aqueous alkaline phase. To produce copolycarbonates with other diphenols, mixtures of diphenols of formula (Ia) and the other diphenols, e.g. those of formula (Ie), are used. To regulate the molecular weight, chain terminators e.g. of formula (If) can be added. Then, in the presence of an inert organic phase, preferably one which dissolves polycarbonate, a reaction with phosgene is carried out by the interfacial polycondensation method. The reaction temperature is between 0° C. and 40° C.

The branching agents that are optionally also used (preferably 0.05 to 2.0 mole %) can either be initially present in the aqueous alkaline phase with the diphenols or added in solution in the organic solvent before phosgenation. In addition to the diphenols of formula (Ia) and optionally other diphenols (Ie), it is also possible to incorporate their mono- and/or bischlorocarbonates, these being added in solution in organic solvents. The quantity of chain terminators and branching agents then depends on the molar amount of diphenolate groups according to formula (Ia) and optionally formula (Ie); when chlorocarbonates are incorporated, the amount of phosgene can be reduced accordingly in a known manner.

Suitable organic solvents for the chain terminators and optionally for the branching agents and the chlorocarbonates are e.g. methylene chloride and chlorobenzene, particularly mixtures of methylene chloride and chlorobenzene. The chain terminators and branching agents used may optionally be dissolved in the same solvent.

Methylene chloride, chlorobenzene and mixtures of methylene chloride and chlorobenzene, for example, are used as the organic phase for the interfacial polycondensation.

NaOH solution, for example, is used as the aqueous alkaline phase. The production of the polycarbonates by the interfacial polycondensation process can be catalysed in a conventional manner by catalysts such as tertiary amines, particularly tertiary aliphatic amines such as tributylamine or triethylamine; the catalysts can be used in quantities of from 0.05 to 10 mole %, based on moles of diphenols used.

The catalysts can be added before the beginning of phosgenation or during or even after phosgenation.

The polycarbonates can be produced by the known process in the homogeneous phase, the so-called "pyridine process", and by the known melt transesterification process using, for example, diphenyl carbonate instead of phosgene.

The polycarbonates preferably have a molecular weight $M_w$ (weight average, deter determined by gel permeation chromatography after previous calibration) of at least 10 000, particularly preferably from 20 000 to 300 000 and particularly from 20 000 to 80 000. They can be linear or branched and they are homopolycarbonates or copolycarbonates based on the diphenols of formula (Ia).

By means of the incorporation of the diphenols of formula (Ia), novel polycarbonates with high heat resistance have been created, which also have a good property profile in other respects. This is particularly true of the polycarbonates based on the diphenols of formula (Ia) in which m is 4 or 5, and most particularly for the polycarbonates based on the diphenols (Ib), wherein $R^1$ and $R^2$ independently of one another have the meaning given for formula (Ia) and are particularly preferably hydrogen.

The particularly preferred polycarbonates are therefore those in which structural units of formula (I) m=4 or 5, most particularly those of units of formula (Ig)

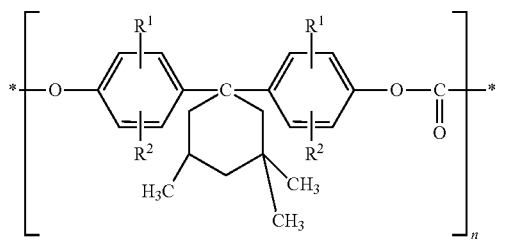

(Ig)

wherein $R^1$, $R^2$ and n have the meaning given for formula (I) but are particularly preferably hydrogen.

These polycarbonates based on diphenols of formula (Ib), Wherein in particular $R^1$ and $R^2$ are hydrogen, possess, in addition to their high beat resistance, good UV stability and good flow properties in the melt, which was not to be expected, and display very good solubility in the monomers mentioned below.

In addition, by means of composition with other diphenols as desired, particularly with those of formula (Ie), the polycarbonate properties can be favourably varied. In these copolycarbonates, the diphenols of formula (Ia) are contained in quantities of from 100 mole % to 2 mole %, preferably in quantities of from 100 mole % to 10 mole % and particularly in quantities of from 100 mole % to 30 mole %, based on the total quantity of 100 mole % of diphenol units, in polycarbonates.

Particularly preferred polycarbonates are copolycarbonates of formula (I-h), wherein the comonomers can be in an alternating, block or random arrangement in the copolymer, p+q=n and the ratio of q and p to one another behaves as reflected by the mole % data mentioned in the previous section for formulae (Ie) and (Ia).

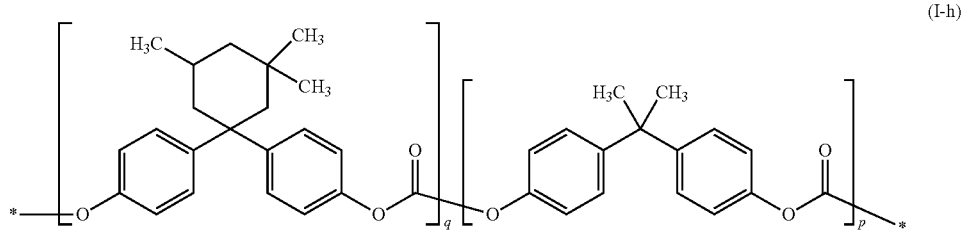

(I-h)

The formable hard coated films according to the present invention comprise a PMMA layer either on one or on both sides of the PC film layer. The formable hard coating composition according to the present invention can be coated on one or on both sides of the PMMA layers.

The PMMA layer has preferably a thickness of ≥15 μm, preferably of ≥30 μm, more preferably of ≥60 μm. The maximum preferred thickness can be easily determined by the skilled person, for the sake of completeness, the maximum preferred thickness of the PMMA layer of the coated film according to the present invention can be ≤300 μm, preferably ≤200 μm, more preferred ≤100 μm. With a coating according to the present invention and a PMMA layer of the base film having the above-mentioned preferred thicknesses, an advantageous combination of pencil hardness of more than 2 H and good formability of the coated film can be achieved.

With respect to the thickness of the respective layers of the coated film according to the present invention, the thickness of the PC layer may be in the range of from 80 to 700 μm, preferably in the range of from 100 to 600 μm and more preferably in the range of from 130 to 500 μm, the thickness of the PMMA layer is as described above, and the thickness of the formable hard coating is also as described above. A typical coated film according to the present invention would comprise a PC layer having a thickness in the range of from 160 to 450 μm, a PMMA layer in the range of from 15 to 65 μm and a top layer consisting of the formable hard coating having a dry film thickness according to ASTM B499 in the range of from ≥1 to ≤6 μm. The coated film according to the present invention may further comprise a masking film atop the formable hard coating and/or a further masking film under the PC layer. Both masking films may contain colorants, may be clear, transparent or not translucent. Similarly, any of the other layers, i.e. PC layer, PMMA layer, formable hard coating layer, may further contain colorants and/or fillers such as nanoparticles, carbon black or pigments.

PMMA as used herein generally means polymethylmethacrylate, in particular polymethylmethacrylate homopolymers and copolymers based on methylmethacrylate having a methylmethacrylate content of at least 70 wt.-%. For example, such PMMAs are available under the trademarks Degalan®, Degacryl®, Plexyglas®, Acrylite® (Fa. Evonik), Altuglas, Oroglas (Arkema), Elvacite®, Colacryl®, Lucite®

(Lucite) and under the names Acrylglas, Conacryl, Deglas, Diakon, Friacryl, Hesaglas, Limacryl, PerClax and Vitroflex.

Preferably, the PMMA layer of the PC/PMMA base film of the coated film according to the present invention can comprise PMMA homopolymers and/or copolymers comprising 70 wt.-% to 99.5 wt.-% methylmethacrylate and 0.5 wt.-% to 30 wt.-% methacrylate. Particularly preferred are PMMA homopolymers and/or copolymers comprising 90 wt.-% to 99.5 wt-% methylmethacrylate and 0.5 wt.-% to 10 wt.-% methacrylate. The softening points VET (ISO 306) may be in the range of from at least 90° C., preferably of from ≤100° C. to ≥115° C. The molecular weight of the PMMA homopolymers and copolymers may be at least 150,000 and preferably at least 200,000. The molecular weights may be determined, for example, by means of gel permeation chromatography or scattered light (see, for example, H. F. Mark et al., Encyclopedia of Polymer Science and Engineering, 2nd. Edition, Vol. 10, p. 1, J. Wiley, 1989).

Coextrued PC/PMMA films which may serve as base films in the coated film according to the present invention are for example available under the trademark Makrolon® from BayerMaterial Sciences.

The present invention further provides a molded article, comprising at least one coated film according to the present invention. Preferably, the molded article is obtained in an in-mold decoration process. In-mold decoration processes are well-known in the art. The skilled person can easily select the process for forming the desired molded article. By employing the coated film according to the present invention, the surface of said article exhibits the advantageous properties of the coated film, such as pencil hardness and resistance to abrasion, solvents and chemicals.

Preferably, the molded article is a mobile phone, a lens integrated housing, a notebook, a netbook, a computer, a TV, a household device, an interior part of a vehicle, or a body part of a vehicle. In these articles, the favorable combination of properties of the coated film according to the present invention also give rise to advantageous combinations of properties which are in most cases important in everyday use of the articles, in particular scratch, abrasion and solvent resistance.

Accordingly, the present invention further relates to the use of the coating composition according to the present invention and/or of the coated film according to the present invention for the manufacture of a molded article, in particular a mobile phone, a lens integrated housing, a notebook, a netbook, a computer, a TV, a household device, an interior part of a vehicle, or a body part of a vehicle, preferably in an in-mold decoration process.

EXAMPLES

General Methods for Producing Coated Films and Forming the Coated Films

Production of Coated PC, PC/PMMA and PMMA Films:

The coated films were produced by wire bar coater and impression bed. The coated films were dried inside an 80° C. oven for 5 minutes before curing at a UV dosage of 4,500 mJ/cm$^2$ with an SSR EVO 407DR curing unit.

Figure 1:
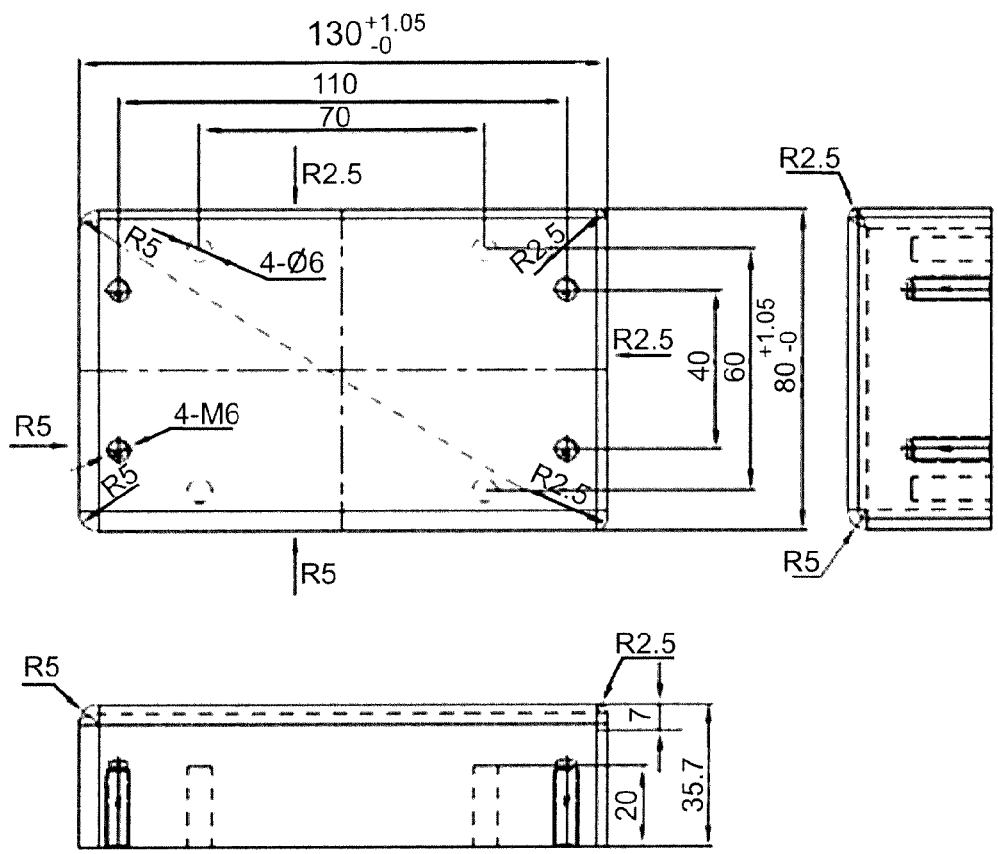
FIG. 1) shows a forming tool with a height of 7 mm and R-values of 2.5 mm and 5 mm.
Figure 2:
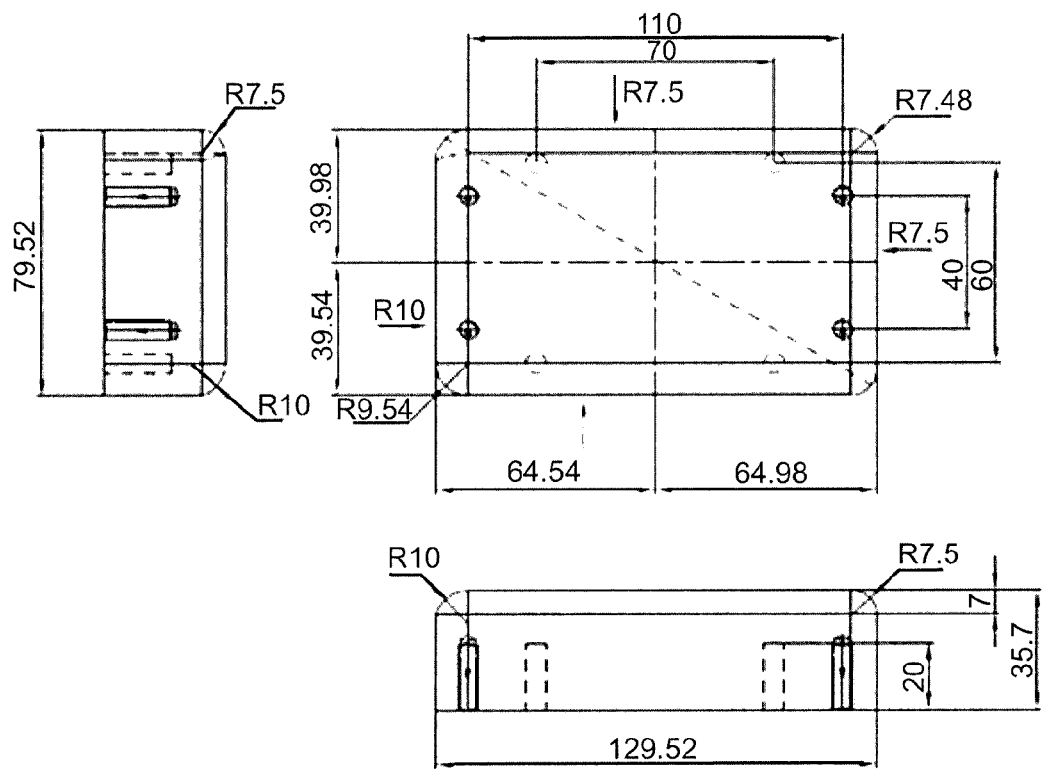
FIG. 2) shows a forming tool with R-values of 7.5 mm and 10 mm.
Figure 3:
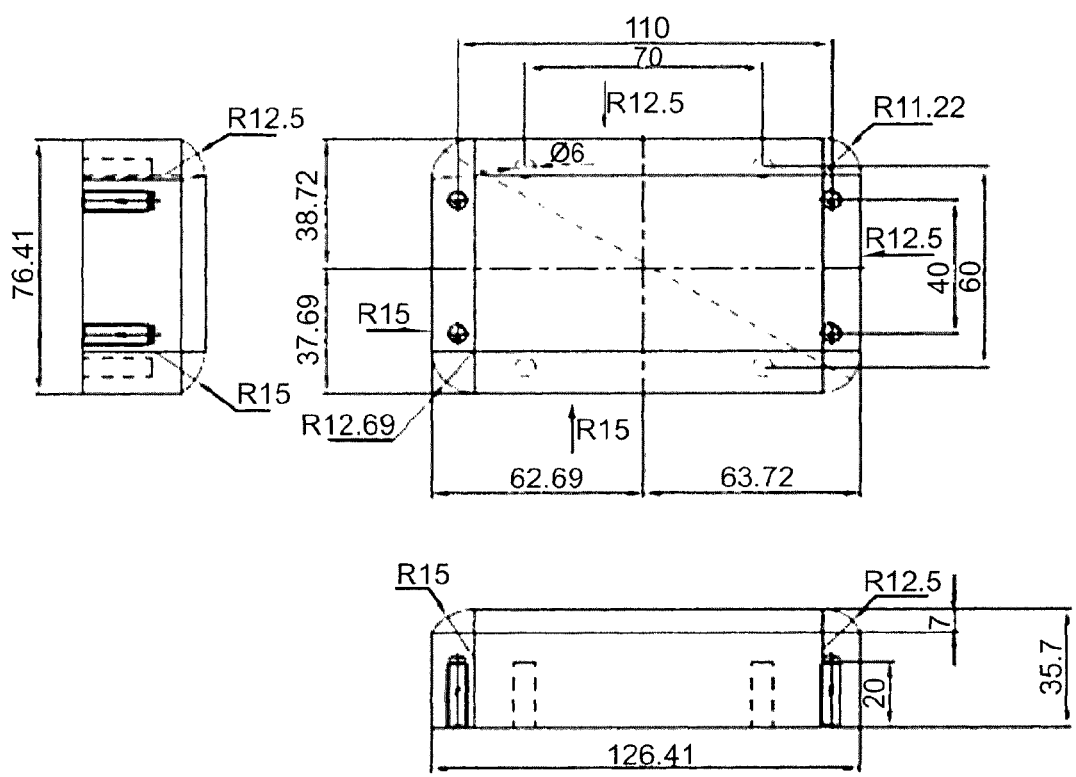
FIG. 3) shows a forming tool with R-values of 12.5 mm and 15 mm.

High-Pressure Forming Process:

A sample of 210 mm length and 148 mm width is placed on a sample plate, heated to a certain temperature and formed to a 3D article by a high pressure forming system on three forming tools with radius of 2.5 mm to 15 mm and forming depth of 7 mm. As forming tools, three cell phone tools with height of 7 mm and R-values of 2.5 mm and 5 mm (FIG. 1), 7.5 mm and 10 mm (FIG. 2), 12.5 mm and 15 mm (FIG. 3) are used. The formed 3D article is evaluated with naked eye and microscopy (Keyence VH-Z00UR @×500).

1. Pass: no crack can be found in top surface, walls, corner and edges.

2. Fail: Crack can be found in top surface, walls, corner and edges.

Before testing, the coated films were conditioned at 23±2° C. and at a relative humidity of 50±5% for a minimum period of 15 h. The high pressure forming process parameters are listed in Table 1:

TABLE 1

Parameters for DFT forming processes.
HPF Forming Conditions

| Parameters | Coated PC and PC/PMMA | Coated PMMA |
| --- | --- | --- |
| IR Temperature (° C.) | 350 | 350 |
| IR Heating Time (seconds) | 15-39 | 14-50 |
| Up Mold Temperature (° C.) | 160 | 100 |
| Down Mold Temperature (° C.) | 110 | 80 |
| Pressure (kg/cm$^2$) | 30 | 30 |
| Pressure keeping time (seconds) | 10 | 10 |

Forming Tools with Different Radius:

The formability of coated films was evaluated by a high pressure forming (HPF) process.

Example 1: Formulation of Formable Hard Coatings Examples

Six formable hard coatings were formulated with the recipes shown in Table 2. Formulations A1 and A6 are not according to the invention and serve as comparative examples.

TABLE 2

Formable hard coating compositions.

| Starting material | Manufacturer | Function | A1 | A2 | A3 | A4 | A5 | A6 |
|---|---|---|---|---|---|---|---|---|
| | | | \multicolumn{6}{c}{Formulation Number Content (wt.-%)} |
| UA-1 | / | Binder (Mixture of urethane acrylates and acrylic monomers with mono-functional double bond group) | 0.0 | 5.8 | 11.6 | 17.4 | 23.3 | 29.1 |
| PETIA | Cytec | Crosslinking agent | 29.1 | 23.3 | 17.4 | 11.6 | 5.8 | 0.0 |
| Additol VXL 4930 | Cytec | Wetting agent | 0.1 | 0.1 | 0.1 | 0.1 | 0.1 | 0.1 |
| Irgacure 184 | Ciba | Photo initiator | 0.9 | 0.9 | 0.9 | 0.9 | 0.9 | 0.9 |
| Butyl Acetate | / | Solvent | 70.0 | 70.0 | 70.0 | 70.0 | 70.0 | 70.0 |

The binder, i.e. UA-1 in table 1, is a mixture of 80 wt.-% urethane acrylate and 20 wt.-% phenoxy diethylene glycol acrylate.

Example 2: Physical Properties and Formability of Formable Hard-Coated Films with Different Cross-Link Densities The physical properties and formability of coated films by coating formulations A1 to A6 according to example 1 on PC/PMMA coextruded films with same thickness of PMMA layer are summarized in table 3. The crosslink densities were determined as described in R. Schwalm, UV Coatings-Basic, Recent Developments and New Applications, Elsevier Science, 2006, Amsterdam; Chen et al. Progress in Organic Coatings 55, 2006, p. 291 to 295; the measurement of the parameters employed is described in ASTM D4752, ASTM D5402.

As outlined under example 2, A1-1 and A6-1 are comparative examples

TABLE 3

Physical properties of coated films; X: cracking; ✓: no cracking

| | | Test method | A1-1 | A2-1 | A3-1 | A4-1 | A5-1 | A6-1 |
|---|---|---|---|---|---|---|---|---|
| Crosslink density of coatings | | / | 14.7 | 12.0 | 9.4 | 6.7 | 4.1 | 1.4 |
| PMMA thickness (µm) | | | 35 | 35 | 35 | 35 | 35 | 35 |
| DFT (µm) | | ASTM B499 | 3 | 3 | 3 | 3 | 3 | 3 |
| Pencil hardness | | JIS 5600-5-4 | 2H | 2H | 2H | 1H | HB | B |
| Transparency (%) | | ASTM D 1003 | 91.0 | 90.9 | 91.0 | 90.9 | 91.0 | 91.0 |
| Haze (%) | | | 0.1 | 0.0 | 0.0 | 0.0 | 0.0 | 0.4 |
| Cross hatch adhesion | | ISO 2409 | 0 | 0 | 0 | 0 | 0 | 0 |
| Adhesion after damp heat cyclic test | | | 0 | 0 | 0 | 0 | 0 | 0 |
| Taber abrasion (CS10F, 500 g) [Δ haze values, %] | 25 cycles | ASTM D 1044 | 0.4 | 0.8 | 0.7 | 0.9 | 1.8 | 5.2 |
| | 100 cycles | | 0.6 | 1.3 | 1.2 | 1.5 | 2.6 | 8.4 |
| | 500 cycles | | 1.5 | 2.4 | 2.3 | 2.8 | 4.5 | 11.1 |
| Solvent Resistance-Spot test, 25° C., 1 hour | IPA | ASTM D 1308 | 0 | 0 | 0 | 0 | 0 | 5 |
| | Xylene | | 0 | 0 | 0 | 0 | 0 | 5 |
| | MPA | | 0 | 0 | 0 | 0 | 0 | 5 |
| | EA | | 0 | 0 | 0 | 0 | 5 | 5 |
| | Acetone | | 0 | 0 | 0 | 5 | 5 | 5 |
| Chemical Resistance-Spot test, 25° C., 24 hours | 0.5% HCl | | 0 | 0 | 0 | 0 | 0 | 0 |
| | 0.5% NaOH | | 0 | 0 | 0 | 0 | 0 | 0 |
| | 5.0% NaCl | | 0 | 0 | 0 | 0 | 0 | 0 |
| | Hand cream [1] | Bayer Internal | 0 | 0 | 0 | 0 | 0 | 0 |
| | Suntan lotion [2] | | 0 | 0 | 0 | 0 | 0 | 0 |
| | Foundation cream [3] | | 0 | 0 | 0 | 0 | 0 | 0 |
| | Lipstick [4] | | 0 | 0 | 0 | 0 | 0 | 0 |
| | Insect repellent [5] | | 0 | 0 | 0 | 0 | 0 | 2 |
| Formability (at forming depth of 7 mm) | R 2.5 | | X | X | X | X | X | X |
| | R 5 | | X | X | X | X | X | ✓ |
| | R 7.5 | | X | X | X | X | ✓ | ✓ |
| | R 10 | | X | X | X | ✓ | ✓ | ✓ |
| | R 12.5 | | X | ✓ | ✓ | ✓ | ✓ | ✓ |
| | R 15 | | X | ✓ | ✓ | ✓ | ✓ | ✓ | formability. On the other hand, when the crosslinking density reaches $1.4 \times 10^{-3}$, although the coated films show good formability, the pencil hardness, chemical/solvent resistance, and abrasion resistance are not good.

Example 3: Physical Properties and Formability of Formable Hard-Coated Films with Different DFT The physical properties and formability of coated films with different DFT by coating formulation A4 obtained in example 1 on PC/PMMA coextruded films having identical thicknesses of PMMA layers are summarized in table 4.

improves from B to 1H when the DFT is increased from 1 μm to 3 μm. No further change to pencil hardness was observed when DFT increases from 3 μm to 6 μm, but the high DFT leads to lower performance in formability. There are also no significant changes in abrasion resistance for DFT from 3 μm to 6 μm.

Example 4: Physical Properties and Formability of Formable Hard-Coated Films with Substrates of Different PMMA Layer Thicknesses The physical properties and formability of coated films by coating formulation A4 obtained in example on PC,

TABLE 4

Physical properties of coated films; X: cracking; ✓: no cracking

| | | Test method | A4-2 | A4-1 | A4-3 |
|---|---|---|---|---|---|
| PMMA thickness (μm) | | / | 35 | 35 | 35 |
| DFT (μm) | | ASTM B499 | 1 | 3 | 6 |
| Pencil hardness | | JIS 5600-5-4 | B | 1H | 1H |
| Transparency (%) | | ASTM D 1003 | 91.0 | 90.9 | 90.9 |
| Haze (%) | | | 0.2 | 0.0 | 0.2 |
| Cross hatch adhesion | | ISO 2409 | 0 | 0 | 0 |
| Adhesion after damp heat cyclic test | | | 0 | 0 | 0 |
| Taber abrasion (CS10F, 500 g)[Δ haze values, %] | 25 cycles | ASTM D 1044 | 4.9 | 0.9 | 0.8 |
| | 100 cycles | | 7.6 | 1.5 | 1.8 |
| | 500 cycles | | 13.2 | 2.8 | 2.9 |
| Solvent Resistance-Spot test, 25° C., 1 hour | IPA | ASTM D 1308 | 0 | 0 | 0 |
| | Xylene | | 0 | 0 | 0 |
| | MPA | | 0 | 0 | 0 |
| | EA | | 5 | 0 | 0 |
| | Acetone | | 5 | 5 | 0 |
| Chemical Resistance-Spot test, 25° C., 24 hours | 0.5% HCl | | 0 | 0 | 0 |
| | 0.5% NaOH | | 2 | 0 | 0 |
| | 5.0% NaCl | | 0 | 0 | 0 |
| | Hand cream [1] | Bayer | 0 | 0 | 0 |
| | Suntan lotion [2] | Internal | 0 | 0 | 0 |
| | Foundation cream [3] | | 0 | 0 | 0 |
| | Lipstick [4] | | 0 | 0 | 0 |
| | Insect repellent [5] | | 2 | 0 | 0 |
| Formability (at forming depth of 7 mm) | R 2.5 | | X | X | X |
| | R 5 | | X | X | X |
| | R 7.5 | | ✓ | X | X |
| | R 10 | | ✓ | ✓ | X |
| | R 12.5 | | ✓ | ✓ | ✓ |
| | R 15 | | ✓ | ✓ | ✓ |

Besides the crosslinking density of formable hard coatings, the DFT of formable hard coating is also one of the key factors determining the resistances to chemical/solvent/abrasion and pencil hardness of coated films. High DFT leads to lower performance in formability. The pencil hardness PC/PMMA and MMA films with varying thickness of PMMA layer are summarized in table 5. Entries A4-4, A4-8, A4-9 and A4-10 are comparative examples (not according to the present invention).

TABLE 5

Physical properties of coated films; X: cracking; ✓: no cracking.

| | Test method | A4-4 | A4-5 | A4-1 | A4-6 | A4-7 | A4-8 | A4-9 | A4-10 |
|---|---|---|---|---|---|---|---|---|---|
| PMMA thickness (μm) | / | 0 | 15 | 35 | 47 | 65 | 175 | 250 | 750 |
| Substrate thickness (μm) | / | 250 | 250 | 250 | 250 | 500 | 175 | 250 | 750 |
| Type of substrate | / | PC | Coextruded PC/PMMA | | | | PMMA (PLEXIGLAS ® film 99524) | | |
| DFT (μm) | ASTM B499 | 3 | 3 | 3 | 3 | 3 | 3 | 3 | 3 |
| Pencil hardness | JIS 5600-5-4 | B | HB | 1H | 1H | 2H | B | B | HB |
| Transparency (%) | ASTM D 1003 | 90.8 | 90.8 | 90.9 | 90.9 | 90.9 | 92.1 | 92.2 | 91.7 |
| Haze (%) | | 0.1 | 0.1 | 0.1 | 0.1 | 0.0 | 0.2 | 0.2 | 0.4 |
| Cross hatch adhesion | ISO 2409 | 0 | 0 | 0 | 0 | 0 | 0 | 0 | 0 |

TABLE 5-continued

Physical properties of coated films; X: cracking; ✓: no cracking.

| | | Test method | Coated film example | | | | | | | |
|---|---|---|---|---|---|---|---|---|---|---|
| | | | A4-4 | A4-5 | A4-1 | A4-6 | A4-7 | A4-8 | A4-9 | A4-10 |
| Adhesion after damp heat cyclic test | | | 0 | 0 | 0 | 0 | 0 | 0 | 0 | 0 |
| Taber abrasion (CS10F, 500 g) [Δhaze values, %] | 25 cycles | ASTM D 1044 | 0.5 | 0.9 | 0.9 | 1.1 | 1.0 | 1.4 | 1.1 | 1.0 |
| | 100 cycles | | 1.1 | 2.0 | 1.5 | 2.2 | 2.3 | 3.0 | 1.6 | 1.8 |
| | 500 cycles | | 1.9 | 3.3 | 2.8 | 2.9 | 3.8 | 4.2 | 2.7 | 2.7 |
| Solvent Resistance-Spot test, 25° C., 1 hour | IPA | ASTM D 1308 | 0 | 0 | 0 | 0 | 0 | 0 | 0 | 0 |
| | Xylene | | 0 | 0 | 0 | 0 | 0 | 0 | 0 | 0 |
| | MPA | | 0 | 0 | 0 | 0 | 0 | 0 | 0 | 0 |
| | EA | | 0 | 0 | 0 | 0 | 0 | 5 | 5 | 5 |
| | Acetone | | 5 | 5 | 5 | 5 | 5 | 5 | 5 | 5 |
| Chemical Resistance-Spot test, 25° C. 24 hours | 0.5% HCl | | 0 | 0 | 0 | 0 | 0 | 0 | 0 | 0 |
| | 0.5% NaOH | | 0 | 0 | 0 | 0 | 0 | 0 | 0 | 0 |
| | 5.0% NaCl | | 0 | 0 | 0 | 0 | 0 | 0 | 0 | 0 |
| | Hand cream [1] | Bayer Internal | 0 | 0 | 0 | 0 | 0 | 1 | 1 | 1 |
| | Suntan lotion [2] | | 0 | 0 | 0 | 0 | 0 | 0 | 0 | 0 |
| | Foundation cream [3] | | 0 | 0 | 0 | 0 | 0 | 0 | 0 | 0 |
| | Lipstick [4] | | 0 | 0 | 0 | 0 | 0 | 0 | 0 | 0 |
| | Insect repellent [5] | | 0 | 0 | 0 | 0 | 0 | 0 | 0 | 0 |
| Formability (at forming depth of 7 mm) | R 2.5 | | X | X | X | X | X | X | X | ✓ |
| | R 5 | | X | X | X | X | ✓ | X | ✓ | ✓ |
| | R 7.5 | | X | X | X | ✓ | ✓ | ✓ | ✓ | ✓ |
| | R 10 | | ✓ | ✓ | ✓ | ✓ | ✓ | ✓ | ✓ | ✓ |
| | R 12.5 | | ✓ | ✓ | ✓ | ✓ | ✓ | ✓ | ✓ | ✓ |
| | R 15 | | ✓ | ✓ | ✓ | ✓ | ✓ | ✓ | ✓ | ✓ |

Formable hard-coated PC films show lower pencil hardness than the coated PC/PMMA films. For the hard coated co-extruded PC/PMMA films, with the increment of PMMA layer thickness, the pencil hardness and formability of coated PC/PMMA films increases. With the formulation A4, the pencil hardness of coated films can reach 2H.

PLEXIGLAS® film 99524 is the series of PMMA films with different film thickness from Evonik for IMD application. It was assumed that coated PMMA films should show higher pencil hardness due to the higher thickness of PMMA layer. However, as shown in table 5 above, the coated PMMA films show lower pencil hardness as compared to coated PC/PMMA films. Chemistry modified PMMA may lead to less rigidity of PMMA films, resulting in the lower pencil hardness of coated PMMA films. Therefore, as the base films, PC/PMMA show advantages over PMMA for the development of coated films for IMD process.

Example 5: Physical Properties and Formability of Formable Hard-Coated Films with Substrates of Different PMMA Layer Thicknesses The physical properties and formability of coated films by coating formulation A2 on PC/PMMA films with varying thickness of PMMA layer are summarized in table 6.

TABLE 6

Physical properties of coated films; X: cracking; ✓: no cracking.

|  |  | Test method | Coated film example | |
|---|---|---|---|---|
|  |  |  | A2-1 | A2-2 |
| PMMA thickness (μm) |  | / | 35 | 65 |
| Substrate thickness (μm) |  | / | 250 | 500 |
| Type of substrate |  | / | Coextruded PC/PMMA | |
| DFT (μm) |  | ASTM B499 | 3 | 3 |
| Pencil hardness |  | JIS 5600-5-4 | 2H | 3H-4H |
| Transparency (%) |  | ASTM D 1003 | 90.9 | 91.0 |
| Haze (%) |  |  | 0.0 | 0.2 |
| Cross hatch adhesion |  | ISO 2409 | 0 | 0 |
| Adhesion after damp heat cyclic test |  |  | 0 | 0 |
| Solvent Resistance-Spot test 25° C., 1 hour | IPA | ASTM D 1308 | 0 | 0 |
|  | Xylene |  | 0 | 0 |
|  | MPA |  | 0 | 0 |
|  | EA |  | 0 | 0 |
|  | Acetone |  | 0 | 0 |
| Chemical Resistance-Spot test, 25° C., 24 hours | 0.5% HCl |  | 0 | 0 |
|  | 0.5% NaOH |  | 0 | 0 |
|  | 5.0% NaCl |  | 0 | 0 |
|  | Hand cream [1] | Bayer | 0 | 0 |
|  | Suntan lotion [2] | Internal | 0 | 0 |
|  | Foundation cream [3] |  | 0 | 0 |
|  | Lipstick [4] |  | 0 | 0 |
|  | Insect repellent [5] |  | 0 | 0 |
| Formability (at forming depth of 7 mm) | R 2.5 |  | X | X |
|  | R 5 |  | X | X |
|  | R 7.5 |  | X | ✓ |
|  | R 10 |  | X | ✓ |
|  | R 12.5 |  | ✓ | ✓ |
|  | R 15 |  | ✓ | ✓ |

Coated PC/PMMA films with pencil hardness more than 2H and good formability can be achieved through adjusting the crosslinking density of coating formulation together with the base films having high thickness of PMMA layer. As shown in the Table above, with formulation A2 and 65 μm PMMA layer of PC/PMMA films, the pencil hardness of coated films can reach 3H to 4H while the coated films show good formability.

The invention claimed is:

1. A coated film, comprising a coextruded PC/PMMA film having a PMMA layer either on one or both sides of the PC film layer and a coating on the PMMA layer obtained by coating with a formable hard coating composition comprising
    a binder, comprising at least one acrylate oligomer and at least one monofunctional acrylic monomer; and
    a crosslinking agent, comprising at least one multifunctional acrylic or methacrylic monomer, wherein the coating has a dry film thickness according to ASTM B499 in the range of from ≥1 to ≤6 μm.

2. The coated film according to claim 1, wherein the coating film has a crosslink density in the range of from $\geq 2 \cdot 10^{-3}$ to $\leq 13 \cdot 10^{-3}$.

3. The coated film according to claim 1, wherein the PMMA layer of the PC/PMMA coextruded film has a thickness in the range of from ≥20 to ≤150 μm.

4. The coated film according to claim 1, wherein the coating has a crosslink density in the range of from $\geq 3.5 \cdot 10^{-3}$ to $\leq 12.5 \cdot 10^{-3}$.

5. The coated film according to claim 1, wherein the coating has a dry film thickness according to ASTM B499 in the range of from ≥2 to ≤5 μm.

6. A molded article, comprising at least one film according to claim 1.

7. The molded article according to claim 6, wherein the article is a mobile phone, a lens integrated housing, a notebook, a netbook, a computer, a TV, a household device, an interior part of a vehicle, or a body part of a vehicle.

8. The molded article according to claim 6, at least in part obtainable in an in-mold decoration process.

9. A method for producing an article comprising utilizing the coated film according to claim 1, wherein the article is a mobile phone, a lens integrated housing, a notebook, a netbook, a computer, a TV, a household device, an interior part of a vehicle, or a body part of a vehicle.

10. The coated film according to claim 1, wherein the ratio of the binder to the crosslinking agent is in the range of from 1:1 to 10:1.

11. The coated film according to claim 1, wherein the at least one acrylate oligomer is selected from the group consisting of polyester acrylates, polyacryl acrylates and urethane acrylates, and mixtures thereof.

12. The coated film according to claim 1, wherein the at least one acrylate oligomer is at least one urethane acrylate.

13. The coated film according to claim 1, wherein the at least one multifunctional acrylic or methacrylic monomer is selected from the group consisting of alkoxylated di-, tri-, tetra-, penta- and hexa-acrylates and -methacrylates, and mixtures therefrom.

* * * * *